(12) United States Patent
Rasztovits-Wiech

(10) Patent No.: US 8,139,939 B2
(45) Date of Patent: Mar. 20, 2012

(54) UPGRADEABLE PASSIVE OPTICAL NETWORK

(75) Inventor: Michael Rasztovits-Wiech, Hornstein (AT)

(73) Assignee: Nokia Siemens Networks Oy, Espoo (FI)

( * ) Notice: Subject to any disclaimer, the term of this patent is extended or adjusted under 35 U.S.C. 154(b) by 525 days.

(21) Appl. No.: 12/419,703

(22) Filed: Apr. 7, 2009

(65) Prior Publication Data

US 2009/0257749 A1  Oct. 15, 2009

(30) Foreign Application Priority Data

Apr. 7, 2008  (EP) ..................................... 08103416

(51) Int. Cl.
*H04J 14/00* (2006.01)
*H04J 14/02* (2006.01)
*H04B 10/20* (2006.01)

(52) U.S. Cl. ................. 398/67; 398/58; 398/68; 398/79
(58) Field of Classification Search ........................ None
See application file for complete search history.

(56) References Cited

U.S. PATENT DOCUMENTS

| 6,411,410 | B1 * | 6/2002 | Wright et al. ................... 398/79 |
| 2009/0028562 | A1 * | 1/2009 | Gianordoli et al. ............. 398/61 |
| 2009/0052893 | A1 * | 2/2009 | Beer et al. ....................... 398/42 |
| 2010/0046941 | A1 * | 2/2010 | Stadler ............................ 398/25 |

\* cited by examiner

*Primary Examiner* — Kenneth N Vanderpuye
*Assistant Examiner* — Abbas H Alagheband
(74) *Attorney, Agent, or Firm* — Laurence A. Greenberg; Werner H. Stemer; Ralph E. Locher

(57) ABSTRACT

A passive optical network is upgraded by a subsystem PON2 for additional high speed communication. The additional subsystem PON2 enables independent high speed communication between a new type of optical network terminations with second downstream time division multiplex signals and second upstream multiplex burst signals via additional upstream and downstream channels.

11 Claims, 5 Drawing Sheets

FIG 3
a)
D1j →
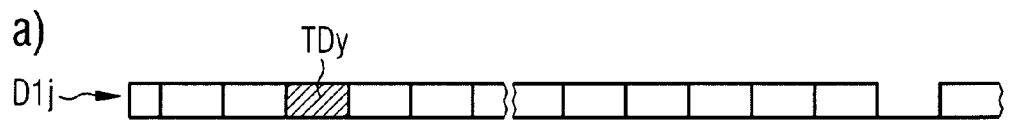
b)
U1j →
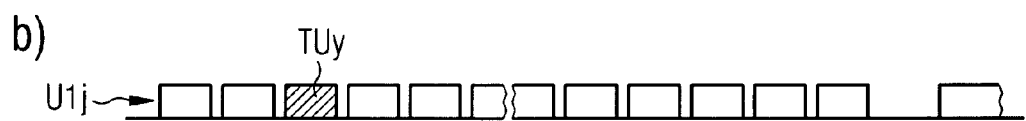
c)
D2j →
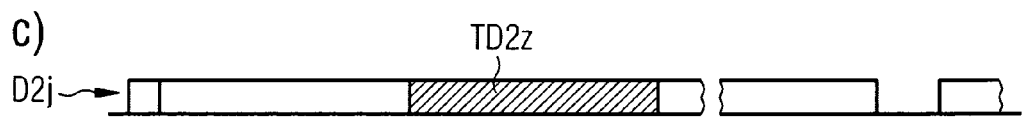
d)
D2j →
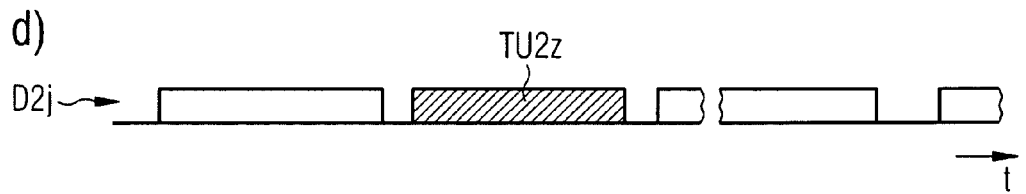

UPGRADEABLE PASSIVE OPTICAL NETWORK

CROSS-REFERENCE TO RELATED APPLICATION

This application claims the priority, under 35 U.S.C. §119, of European patent application EP 08 103 416, filed Apr. 7, 2008; the prior application is herewith incorporated by reference in its entirety.

BACKGROUND OF THE INVENTION

Field of the Invention

The invention is directed to a passive optical network enabling standard and high speed communication.

M. Rasztovits-Wiech describes in an article "Bidirectional EDFA for Future Extra Large Passive Optical Networks", ECOC2006, paper Mo4.5.7, 2006 a XL-PON (passive optical network/Super PON) system using WDM (wavelength division multiplexing) in a metro-network in addition to TDM (time division multiplexing). A different optical carrier signal is necessary for each connection between an optical line termination OLT and a metro access point MAP. An optical distribution network (ODN) connects via a splitter a plurality of optical network terminations ONTs with the metro access point. In a basic system, the same wavelength is used for transmission of all ONTs upstream burst signals.

It is also known to use wavelength converters in the MAPs, so that in the ODN all downstream signals can also be transmitted using the same wavelength.

Static and dynamic bandwidth allocation is a method to meet the different demands of the costumers. According to this method the lengths of data packets and bursts according to the demand of customers is varied. But especially the total upstream bandwidth remains constant and may not meet future requirements. The bandwidth problem is further increased by a high splitting factor.

In a document "Towards a future access network: XL-PON, PIEMAN and fully tuneably networks" SPI APOC 2007 conference, Paper 6784-8 Harald Rohde et al. describe a fully flexible PON with tuneable ONT (optical network terminations or optical network units ONUs). This future system is cost intensive and has also technical limitations.

SUMMARY OF THE INVENTION

It is accordingly an object of the invention to provide a passive optical network (PON), which overcomes the above-mentioned disadvantages of the heretofore-known devices and methods of this general type and which provides for an economical PON system that can also meet future requirements for greater bandwidth.

With the foregoing and other objects in view there is provided, in accordance with the invention, a passive optical network, comprising:

an optical line termination and at least one group of optical network terminations;

point-to-multipoint connections between the optical line termination and the at least one group of optical network terminations, with an optical splitter and a metro access point connected between the at least one group of optical network terminations and the optical line termination;

wherein the passive optical network is configured:

for transmitting first downstream multiplex signals using a first downstream wavelength band from the optical line termination to the metro access point and for transmitting first upstream multiplex burst signals using a first upstream wavelength band, having the same spectral range as the first downstream wavelength band, from the metro access point to the optical line termination;

for transmitting at least one second downstream multiplex signals using a second downstream wavelength band from the optical line termination to the metro access point and for transmitting second upstream multiplex burst signals using a second upstream wavelength band, having the same spectral range as the second downstream wavelength band, from the metro access point to the optical line termination;

for transmitting a first downstream multiplex signal by first downstream channels, from the metro access point via an optical fiber and a splitter in an optical distribution network to a group of optical network terminations and for transmitting a second downstream multiplex signal by second downstream channels from the metro access point via the optical fiber and the splitter to the same group of optical network terminations; and the optical network terminations including:

a first type of optical network terminations configured to accept first downstream channels and to transmit a first upstream multiplex burst signal in a first upstream channel; and a second type of optical network terminations configured to accept second downstream channels and to transmit a second upstream multiplex burst signal in a second upstream channel; and wherein time slots of the second downstream multiplex signal and/or time slots of the second upstream multiplex burst signal are longer than time slots of the first downstream multiplex signal and/or time slots of the first upstream multiplex burst signal, respectively.

The invention is directed to an upgradable system, which meets the requirements of a common PON system but which is also upgradable for higher bandwidth requirements by adding an independent PON2 subsystem.

The system is easily upgraded by substituting the ONTs by a new type of ONT2s and by upgrading the metro access points.

Other features which are considered as characteristic for the invention are set forth in the appended claims.

Although the invention is illustrated and described herein as embodied in an upgradeable passive optical network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 3 shows a time diagram of multiplex signals;

DETAILED DESCRIPTION OF THE INVENTION

Figure 1:
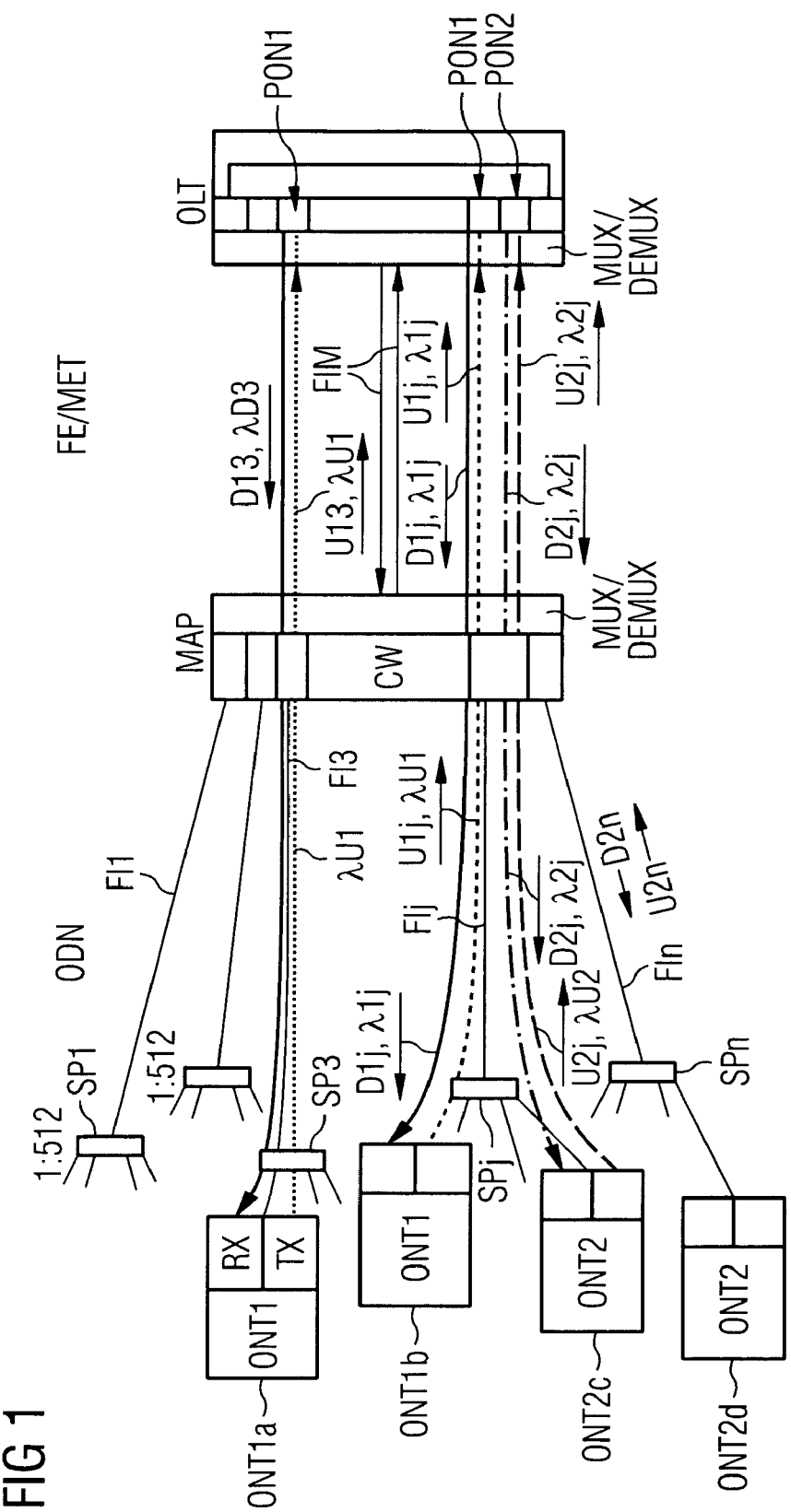
FIG. 1 shows a simplified block diagram of a PON illustrating an exemplary embodiment of the invention.

Referring now to the figures of the drawing in detail and first, particularly, to FIG. 1 thereof, the simplified block diagram illustrates a Passive Optical Network PON according to the invention. An optical line termination OLT is connected via optical fibers FIM of a feeder or metro net (e.g. a ring) to at least one metro access point MAP. FIG. 1 shows the logical connections between OLT and MAP, and only one MAP is shown for reasons of clarity. The physical connection between OLT and MAP is (usually) established by two optical fibers, one fiber for each direction for transmitting a wavelength division multiplex signal (WDM signals).

In an optical distribution network ODN are several groups ONTa, ONTb, ONTc, ONTd, . . . of two types of optical network terminations ONT1s and/or ONT2s connected via an associated power splitter SP1-SPn and an associated fiber FI1-FIn to the MAP. Each group receives a downstream time division multiplex signals according to a common or new PON standard.

Each downstream signal in the ODN is a time division multiplex signal D1$j$, modulated onto an optical carrier $\lambda 1j$. The carrier wavelengths or channels for OLT-MAP connections are in also used for the MAP-ONT connections.

A first group ONT1$a$ comprising a=1, 2, 3, . . . ONT1$s$ is connected via a fiber FI3 to the MAP. Shown is only one ONT1. The downstream time division multiplex signal D13 is transmitted by an optical carrier $\lambda 1j=\lambda 13$ from the OLT via the MAP to the group ONT1$a$. Each ONT1 of this group emits a burst signal, which is modulated onto a first optical upstream carrier $\lambda U1$, and then the burst signals of the ONT1$s$ are multiplexed by the splitter SP3 and form a first upstream multiplex burst signal U13. A first upstream carrier wavelength $\lambda U1$ is used by all ONTs of type ONT1. The optical upstream carrier $\lambda U1$ is usually generated by the ONTs themselves (different lasers) and therefore the carrier frequencies can be slightly different. Because all ONT1$s$ use the same upstream carrier wavelength, and if further the receiver of the ONT1 has a wide wavelength range, they can be easily exchanged in the case of malfunctioning.

Like in most PONs different optical carrier wavelengths are used for downstream und upstream transmission in the fibers. FI1-FIn of the ODN to avoid disturbances of the optical signals.

The upstream bit rate is normally lower than the downstream bit rate, e.g. downstream 10 Gbit/s and upstream 2.5 Gbit/s for a future system.

The optical line termination OLT is responsible for the "bandwidth" allocation for the downstream as well as for the upstream signals, in other words: For the timing of all optical network units ONTs. The downstream signals carry also the necessary timing information.

This described mode of operation complies with a common PON system and with a sub-function of the new PON system, referred to as PON1 subsystem.

According to recommendations a wavelength band between 1529.55 nm and 1544.53 nm shall be used for upstream communication and a wavelength band between 1548.51 nm and 1563.86 nm shall be used for downstream communication.

The general concepts of the invention are as follows:

To upgrade the PON1 subsystem by a second high bandwidth subsystem PON2 system using the same transmission fibers.

To use recommended downstream band for the PON1 downstream trans-mission in both feeder/metro net and the ODN and use the same frequency band for PON1 upstream communication in the feeder/metro net.

To use a part of the recommended upstream band for downstream and upstream transmission in both the feeder/metro net of the PON2 subsystem.

To use a second upstream channel in the ODN for subsystem PON2 upstream transmission.

Optionally use new generation ONT1$s$ and ONT2$s$ with broadband or wavelength selective receivers and/or transmitters with different or tuneable lasers.

To use high bandwidth capacity timeslots in the upstream channel and/or downstream channel in the superimposed PON2 system.

To allow independent and separate operation of PON1 and PON2 subsystems.

Figure 2:
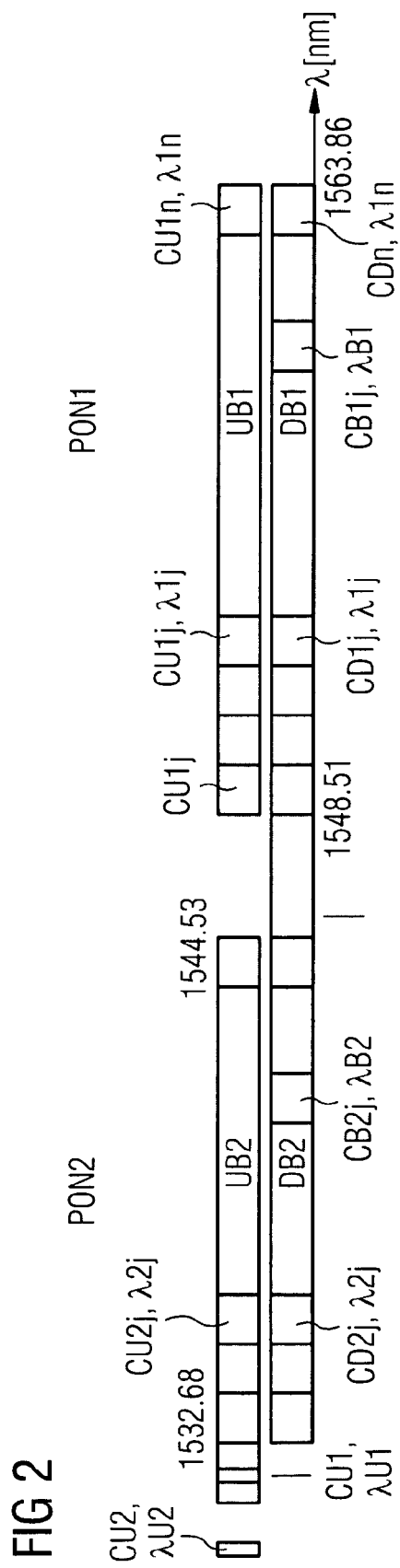
FIG. 2 shows a wavelength diagram.

The use of the new wavelength bands is explained referring to a wavelength diagram illustrated in FIG. 2. The standard downstream wavelength band DB1 is used by the PON1 for downstream transmission of WDM-signals (wavelength division multiplex) from OLT to MAP and MAP to ONTs of type ONT1. E.g. 40 downstream channels CD1$j$ with different wavelengths $\lambda 1j$ are used for data transmission of signals D1$j$ from the OLT and groups of ONT1$s$.

The same wavelengths/carriers (of the original downstream band) are now also used for PON1 upstream transmission in the feeder or metro net FE/MET. This new upstream band is designated UB1 in FIG. 2 and is now used in our PON1 to transmit the upstream multiplex burst signals U1$j$ from the MAP to the OLT.

Therefore, a major part of the former recommended upstream wavelength band is free for new applications.

An operation of the PON2 subsystem is now described referring again to the wavelength diagram FIG. 2 and FIG. 1, showing a mixed group ONT1$b$, ONT2$c$ comprising both types ONT1 and ONT2.

As shown in FIG. 1 a plurality of both types ONT1 and ONT2 is connected to the same splitter SP$j$. Only one ONT1 and one ONT2 are shown for clarity reasons. In the shown embodiment one group can comprise up to 512 ONTs according to a splitting factor 1:512.

The subsystem PON1 transmits a first downstream time division multiplex signal D1$j$ (solid line, see FIG. 1) to a plurality ONT1$j$ of j=1, 2, . . . ONT1$s$. The ONTs of type ONT1 have a broadband receiver accepting all downstream frequencies $\lambda 1j$ located in the wavelength band DB1 or are tuned to a downstream channel.

All ONT1$s$ use the same upstream wavelength $\lambda U1$ (dotted line) to transmit a burst of the upstream multiplex burst signal U1$j$ as described before.

Because of the wavelength arrangement the subsystem PON2 is able to transmit a similar number of downstream time division multiplex signals D2$j$ (j=1-n) using second downstream channels CD2$j$ located the second downstream wavelength band DB2, and the ONT2$s$ are able to transmit an upstream multiplex burst signal U2$j$ in a second upstream channel CU2$j$ of the upstream wavelength band UB2. The same reference signs for the signals, e.g. D1$j$, D2$j$, U1$j$, U2$j$, are used in the feeder or metro net FE/MET and in the optical distribution network ODN.

In the ODN the downstream time division multiplex signals D2$j$ are also transmitted in the wavelength band DB2 to all ONTs but they are only accepted by the ONT2$s$. The ONT2$s$ comprise broadband receivers capable to receive all channels of the wavelength band DB2. Of course, tuneable receivers can also be installed. PON1 and PON2 domains are indicated in FIG. 1 at the OLT.

Optionally, standard downstream channels can be used on all ODN fibers FI1-FIn, if the MAP comprises wavelength converters, which convert the carrier wavelengths of the PON1 downstream channels CD1$j$ into channels CB1$j$ (j=1-n) with the same carrier wavelength $\lambda B1$. In the same way the downstream channels CD2$j$ of the PON2 can be converted into standard downstream channels CB2$j$ with the same carrier wavelength $\lambda B2$.

Also subcarrier modulation of the PON2 downstream channels could be a considerable feature. The PON2 downstream signals are subcarrier modulated onto the came carrier as the PON1 downstream signals.

For upstream transmission all ONT2s use a second upstream channel CU2, which carrier wavelength λU2 is different from the carrier wavelength λU1 of the first upstream channel CU1.

Therefore both PON subsystems can operate completely independent from each other at the same time. At the MAP the upstream channels have to be wavelength-converted into WDM channels of the upstream bands UB1 and UB2.

Usually the ONT1s have to be substituted by ONT2s to achieve higher speed connections. Adaptable ONTs with wavelength tuneable transmitters/receivers and with ONT1 as well as ONT2 functions can be installed in new systems to meet the customers' demands. Thermal tuning of the laser transmitters would be sufficient to change the upstream channel because of the similar carrier wavelengths λU1 and λU2 used for ONTs of type ONT1 and ONT2.

The improvement in the bandwidth (effective transmission rate) per user of the superimposed PON2 is achieved by assigning less ONT2s than ONT1s to a downstream and/or upstream channel. If the bandwidth of a channel is shared by a smaller number of ONTs, then the bandwidth per ONT2 increases. This example is illustrated in FIG. 3 showing the downstream und upstream frames used for data transmission on the fiber FIj between the OLT and the splitter SPj. The first line "a" shows schematically a downstream multiplex frame carrying the downstream time multiplex signal D1j of the PON1 subsystem. The first downstream frame is divided into a plurality of time slots TDy; y=1, 2, 3, ... according to the number of ONT1s. The upstream frame, line "b", carrying the upstream multiplex burst signal U1j, is also divided into the same number of burst time slots TUy carrying the upstream time multiplex burst signal U1j.

Lines "c" and "d" show a second downstream frame carrying the second downstream time division multiplex signal D2j is divided into time slots TD2z; z=1, 2, 3, ... and a second upstream frame carrying the second upstream multiplex burst signal U2j is divided into time slots TU2z of the PON2 subsystem. The length of a PON2 time slot is longer compared to a PON1 time slot and therefore the bandwidth per user is increased, e.g. by 4, even if the transmission rates of PON1 and PON2 are the same.

A group ONT2d containing only ONTs of type ONT2s is connected via a splitter SPn and a fiber FIn (FIG. 1) to the OLT.

Of course also possible is stacking further PON subsystems onto PON1 and PON2 by either utilizing further available wavelength bands e.g. above 1563.86 nm or below 1529.55 nm, or by subdividing the wavelength range between 1529.55 nm and 1563.86 nm into bands in a different way.

Figure 4:
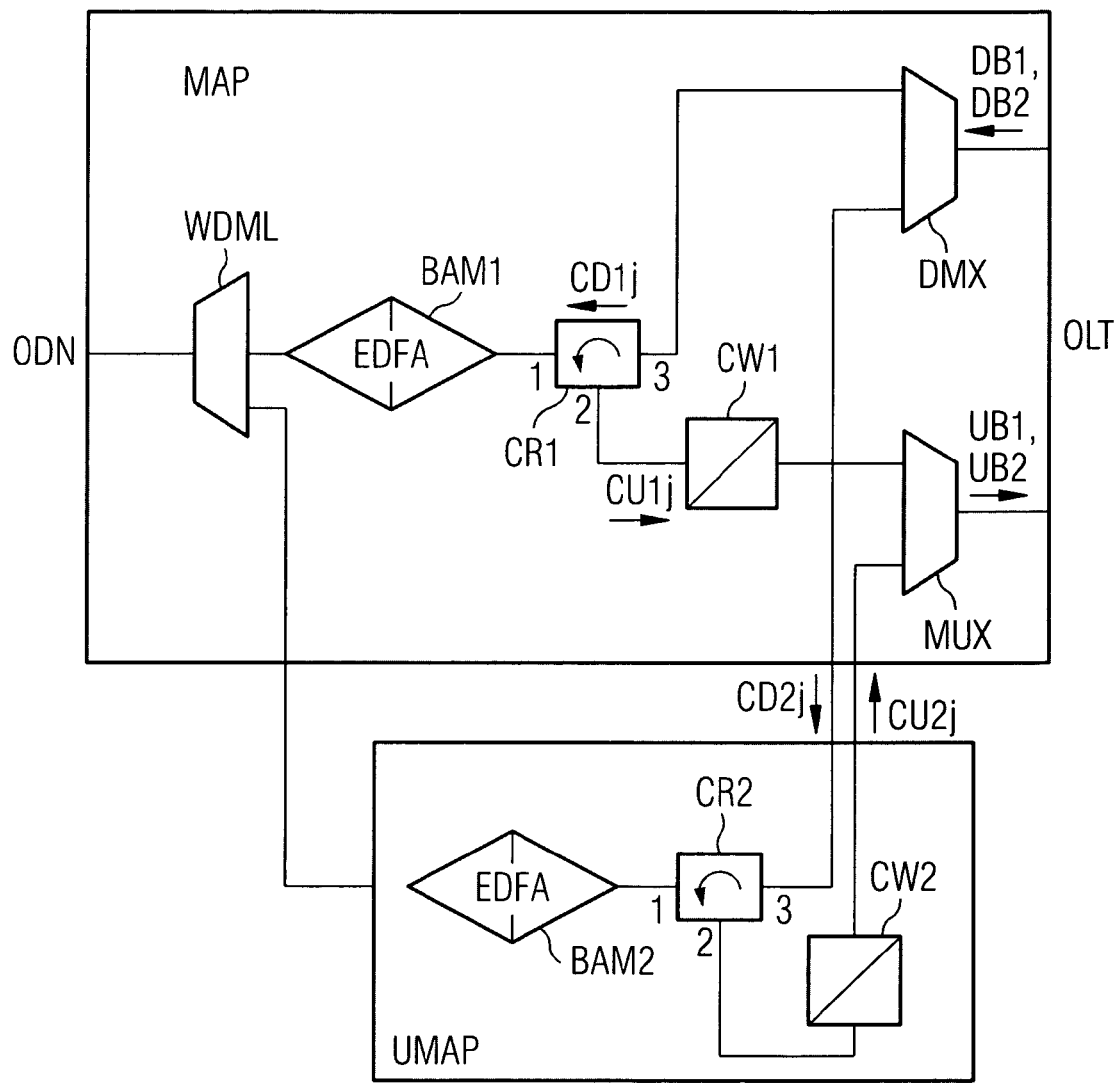
FIG. 4 shows a basic embodiment of an upgradeable MAP.

FIG. 4 shows an example of an upgradeable MAP connected by means of two fibers to the OLT. The MAP assigned to PON1 subsystems comprises a first bidirectional amplifier BAM1, connected via a wavelength division line multiplexer WDNL (e.g. circulator and WD multiplexer) to the ODN and via a first circulator CR1 towards the OLT. The WDNL (circulator and demultiplexer) can be replaced by a power-splitter/combiner. The circulator CR1 separates the downstream an upstream signals. A wavelength division demultiplexer DMX, wavelength converters CW1, CW2 and a wavelength division multiplexer MUX are inserted between the second and third circulator CR1 terminals and the OLT. This drawing illustrates only a selection of one PON1 downstream channel. But additional downstream channels can be selected if a demultiplexer DMX with additional outputs is applied.

An upgrade unit UMAP comprises a second bidirectional amplifier BAM2 and a second circulator CR2 connected in series by their first terminals. The second and third terminal of the second circulator CR2 are connected to a further input of the multiplexer MUX and a further output of the demultiplexer DMX. The other amplifier terminal is connected to the wavelength division line multiplexer WDNL.

PON1 and PON2 traffic is separated by the Demultiplexer DMX and wavelength division line multiplexer WDNL and amplified by different amplifiers.

Figure 5:
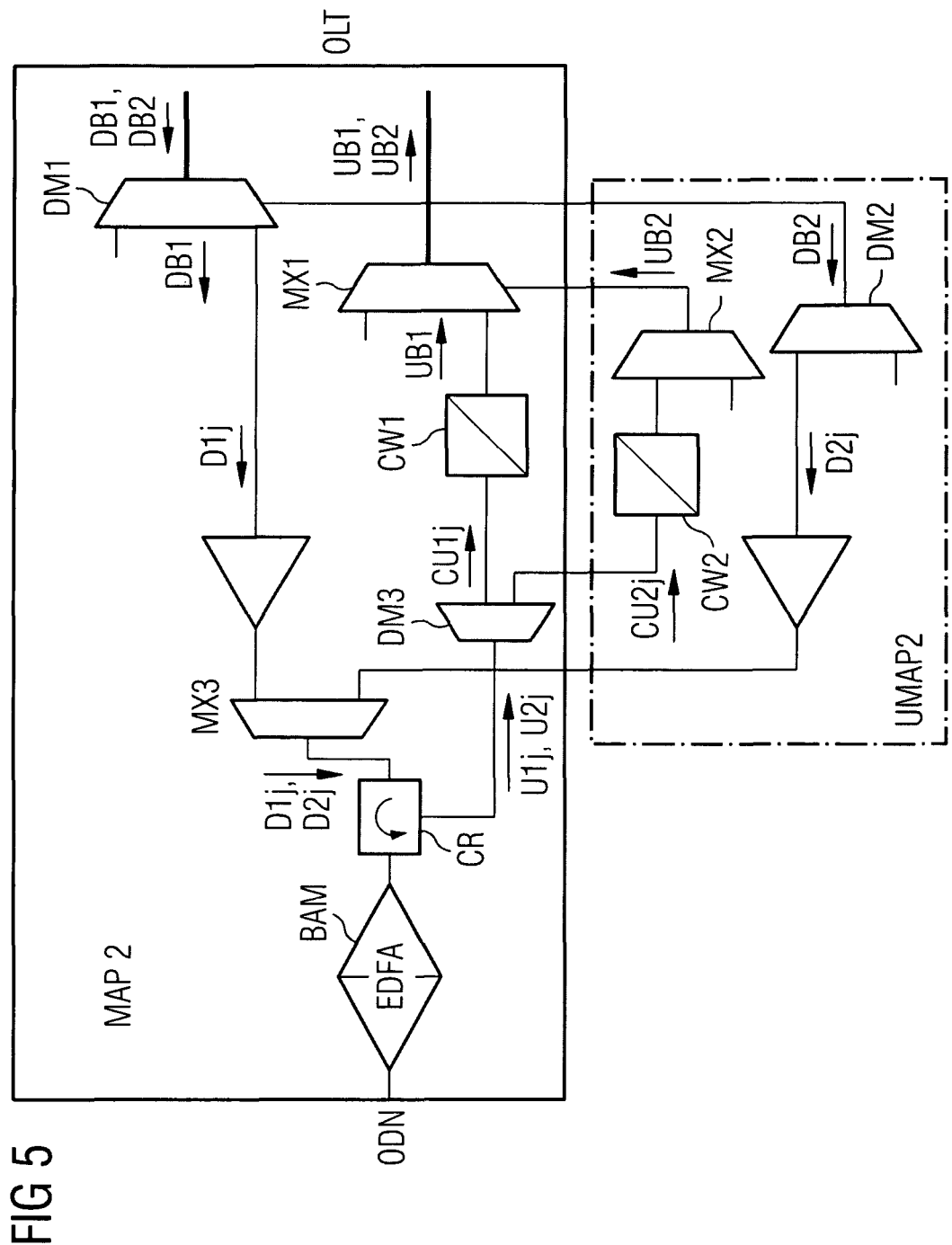
FIG. 5 shows a more economic upgradeable MAP architecture.

Another solution, shown in FIG. 5 shares the optical bidirectional amplifier (BAM) between PON1 and PON2 signals.

FIG. 5 illustrates an advanced MAP2 and an advanced upgrade unit UMAP2 for a plurality of PON1 and PON2 channels. The downstream wavelength bands DB1, DB2 are separated and divided into channels (respectively signals) by a first demultiplexer DM1 and a second demultiplexer DM2 (only one channel per DB1 and DB2 is shown in FIG. 5). The selected channels (only one channel per DB1 and DB2) are amplified, combined in a third multiplexer MX3, fed via a circulator CR to a bidirectional amplifier BAM and transmitted to a group of mixed ONTs of type 1 and type 2.

The upstream signals are separated by the circulator CR from the down-stream signals and divided by a demultiplexer DM3 into the separate upstream channels CU1 and CU2. Wavelength converters CW1 and CW2 convert these channels into a channel of the first upstream band UB1 and a channel of the second upstream band UB2. After multiplexing in MX2 and MX1 the WDM-signals are sent to the OLT.

If the system uses downstream channels with the same carrier wavelengths, then additional wavelength converters have to be inserted in the down-stream paths of the PON1 downstream signal and the PON2 downstream signal. Of course, other MAP arrangements are also possible.

The following list of abbreviations and reference signs may aid the reader in understanding the specification:

PON passive optical network
PON1 PON1 subsystem
PON2 PON subsystem
ODN optical distribution network
OLT optical line termination
ONT optical network termination
ONT1 ONT type 1
ONT2 ONT type 2
FIj fiber j in ODN between MAP and splitter
FE/MET feeder/metro net
MAP metro access point
MAP2 metro access point with upgrade ports for UMAP2
SPj jth power splitter
λ wavelength
DB1 first downstream band
UB1 first upstream band
DB2 second downstream band
UB2 second upstream band
D1j first downstream multiplex signal
λ1j carrier wavelength of D1j and U1j in FE/MET
U1j first upstream multiplex burst signal
λU1 carrier wavelength of U1j in the ODN
D2j second downstream multiplex signal
λ2j carrier wavelength of D2j and U2j in FE/MET
U2j second upstream multiplex burst signal
λU2 carrier wavelength of U2j in the ODN
CD1j downstream channel of PON1
CU1j upstream channel of PON1
CD2j downstream channel of PON2
CU2j upstream channel of PON2
CB1 first downstream channels with same carrier wavelength of PON1
CB2 second downstream channels with same carrier wavelength of PON2
UMAP upgrade unit for overlaid PON
UMAP2 optimized upgrade unit, sharing the bidirectional optical amplifier
DMX demultiplexer MUX multiplexer
CR circulator
BAM1 bidirectional amplifier for PON1 signals
BAM2 bidirectional amplifier for PON2 signals
WDML line-multiplexer
CW wavelength converter
MX1 multiplexer for UB1 wavelength band
MX2 multiplexer for UB2 wavelength band
DM1 demultiplexer for DB1 wavelength band
DM2 demultiplexer for DB2 wavelength band

The invention claimed is:

1. A passive optical network, comprising:
an optical line termination and at least one group of optical network terminations;
point-to-multipoint connections between said optical line termination and said at least one group of optical network terminations; and
an optical splitter and a metro access point connected between said at least one group of optical network terminations and said optical line termination;
wherein the passive optical network is configured:
for transmitting first downstream multiplex signals using a first down-stream wavelength band from said optical line termination to said metro access point and for transmitting first upstream multiplex burst signals using a first upstream wavelength band, having the same spectral range as the first downstream wavelength band, from said metro access point to said optical line termination;
for transmitting at least one second downstream multiplex signals using a second downstream wavelength band from said optical line termination to said metro access point and for transmitting second upstream multiplex burst signals using a second upstream wavelength band, having the same spectral range as the second downstream wavelength band, from said metro access point to said optical line termination;
for transmitting a first downstream multiplex signal by first down-stream channels, from said metro access point via an optical fiber and a splitter in an optical distribution network to a group of optical network terminations and for transmitting a second downstream multiplex signal by second downstream channels from said metro access point via said optical fiber and said splitter to the same group of optical network terminations; and
said optical network terminations including:
a first type of optical network terminations configured to accept first downstream channels and to transmit a first upstream multiplex burst signal in a first upstream channel; and
a second type of optical network terminations configured to accept second downstream channels and to transmit a second upstream multiplex burst signal in a second upstream channel; and
wherein time slots of the second downstream multiplex signal and/or time slots of the second upstream multiplex burst signal are longer than time slots of the first downstream multiplex signal and/or time slots of the first upstream multiplex burst signal, respectively.

2. The passive optical network according to claim 1, wherein said metro access point comprises wavelength converters for converting a carrier wavelength of the first upstream channels into carrier wavelengths of WDM-channels of the first upstream wavelengths band and for converting the carrier wavelengths of the second upstream channels into carrier wavelengths of WDM-channels of the second upstream band.

3. The passive optical network according to claim 1, wherein said metro access point is configured:
to demultiplex the first downstream channels located in the first downstream wavelengths band and transmit the associated downstream time division multiplex signal to said group of optical network terminations; and
to demultiplex the second downstream channels located in the second downstream wavelengths band into the second downstream channels and to parallel-transmit the associated second downstream time division multiplex signals to the same group of optical network terminations.

4. The passive optical network according to claim 1, wherein said metro access point is configured for:
converting all first downstream channels of the first downstream wavelength band having different carrier wavelengths into first downstream channels in the optical distribution network having the same first carrier wavelength; and
converting all second downstream channels of the second downstream wavelength band having different carrier wavelengths into second downstream channels in the optical distribution network having the same second carrier wavelength.

5. The passive optical network according to claim 4, wherein said metro access point is configured to transmit first downstream channels and second downstream channels with different carrier frequencies.

6. The passive optical network according to claim 4, wherein said metro access point is designed for sub-carrier modulating the first downstream time division multiplex signal and/or the second downstream time division multiplex signal onto a common optical carrier.

7. The passive optical network according to claim 1, wherein said metro access point is designed for sub-carrier modulating the first downstream time division multiplex signal and/or the second downstream time division multiplex signal onto a common optical carrier.

8. The passive optical network according to claim 1, wherein said metro access point is connected by a single optical fiber to an optical splitter and the first down-stream time division multiplex signal and the second downstream time division multiplex signal and/or the first upstream multiplex burst signal and the second upstream multiplex burst signal are transmitted by said single optical fiber.

9. The passive optical network according to claim 1, wherein said optical line termination is configured:
to transmit a first downstream time division multiplex signals to another group of only the first type of optical network terminations and to receive only a first upstream multiplex burst signal in from this group and/or
to transmit a single second downstream time division multiplex signals to another group of said optical network terminations comprising only the second type of optical network terminations and to receive only a second upstream multiplex burst signals from the other group.

10. The passive optical network according to claim 1, wherein said metro access point is designed for connections with type 1 optical network terminations and upgradeable by an upgrade unit for connections with type 2 optical network terminations.

11. The passive optical network according to claim 1, wherein said metro access point comprises:
a bidirectional amplifier having a first terminal connected to receive first and the second upstream multiplex burst signals from said optical line terminations and a second terminal connected to receive the first and the second downstream time division multiplex signal;
a circulator connected to said second amplifier terminal and configured to divide the upstream multiplex burst signals and downstream time division multiplex signals;

a wavelength division demultiplexer having an input connected to a second circulator terminal of said circulator outputting the first upstream multiplex burst signal and the second upstream multiplex burst signal;

wavelength converters converting the wavelengths of the first and second upstream multiplex burst signal into wavelengths of the first and second upstream band; and a wavelength division multiplexer having an output connected to a third circulator terminal of said circulator combining the first and the second downstream time division multiplex signal.

* * * * *